(No Model.)
J. H. L. TUCK.
EXCAVATOR.
No. 465,738. Patented Dec. 22, 1891.
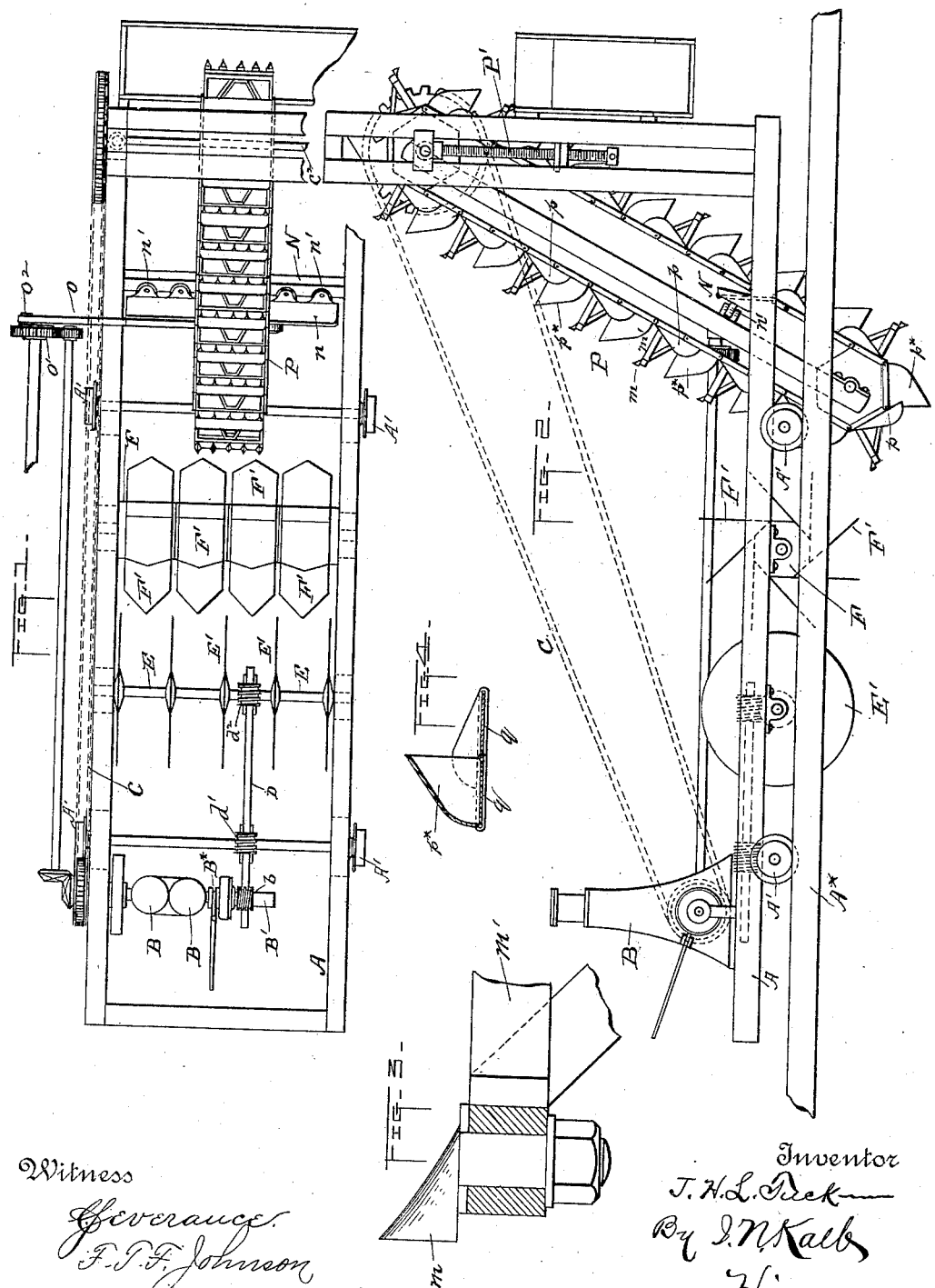
Witness
Severance
F.T.F. Johnson
Inventor
J. H. L. Tuck
By I. N. Kalb
His Attorney

United States Patent Office.

JOSIAH H. L. TUCK, OF SAN FRANCISCO, CALIFORNIA.

EXCAVATOR.

SPECIFICATION forming part of Letters Patent No. 465,738, dated December 22, 1891.

Application filed March 6, 1891. Serial No. 383,982. (No model.)

*To all whom it may concern:*

Be it known that I, JOSIAH H. L. TUCK, a citizen of the United States, residing at San Francisco, in the county of San Francisco and State of California, have invented certain new and useful Improvements in Excavators, Levee-Builders, and Ditchers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to excavating, levee-building, and ditching machines, and particularly to such as are devised for cutting soddy and rooty spoil and building levees. In soft marshes and tule-lands, where this sort of excavating is done, the roots and sod prove so tough and difficult to work that the ordinary excavator will dig the dirt from around them and will leave this tough and difficult material in an unreduced and unmanageable condition.

The object of my invention is to provide a machine which will completely reduce the roots, &c., to a condition to be readily taken by a carrier-excavator, and when so reduced the roots and tussocks make most excellent material for building embankments, levees, &c.

The invention consists in the construction and combination of parts hereinafter described, and pointed out in the claims.

The accompanying drawings illustrate what I consider the best means for carrying my invention into practice.

Figure 1 is a plan view of the device. Fig. 2 is a side elevation, some of the framing being broken away. Figs. 3 and 4 are detail views.

Similar letters of reference indicate corresponding parts in all the figures where they occur.

A is the framing of the device, mounted upon truck-wheels $A'$ $A'$, which are intended to run upon tracks $A^*$ to be temporarily laid where the work is to be done. The axles of the truck are to be operated from the engines B B, which are carried on the frame.

C is a driving-chain extending from a sprocket-wheel on the engine-shaft $B'$ to the rear and upper end of the frame, where it is engaged by another sprocket-wheel on the shaft $C^2$, on which the upper drum of the bucket-excavator P is placed. The engine-shaft $B'$ is also provided with a worm $b$, which engages a worm on a longitudinal shaft D, which is provided with a worm $d'$, engaging a worm-wheel on the front axle of the truck, and at a point farther back a second worm $d^2$, which engages a worm-wheel on the forward cutter-shaft E. A friction-clutch $B^*$ is provided upon shaft $B'$ to throw the shaft D into and out of operation, so that the progression of the machine may be stopped while the excavator is continued in action.

Upon the shaft E disk cutters $E'$ are arranged, which cut the sod and soil into longitudinal strips of suitable width. Located upon the frame in the rear of shaft E is a drum F, which carries a series of transverse cutters $F'$, which dig into and cut the sod transversely as the machine is progressed. The drum F need not be power-driven, as the forward progression and engagements of the knives $F'$ with the soil will rotate the drum and keep up the action of the cutters. The knives or cutters $F'$ are arranged in spiral order upon the drum F, so that only one of them will come in contact with the sod or surface of the soil at the same time. The knives $F'$ are pointed to cut the sod and enter the ground more easily and cut the strips into any desired lengths. The longitudinal cutters $E'$ match the interstices between the sets of transverse cutters or knives $F'$, so that each transverse knife shall cut one of the transverse strips made by the cutters $E'$.

The carrier-excavator is equipped with the usual chain, which runs over drums in the usual way. Upon each alternate link of the chain a bucket $P^*$ is secured, and on the intervening links are secured guides Q, which form in effect continuations of the sides of the buckets and prevent the spoil from being spilled out before the bucket reaches the dumping-point. Under each link is secured an apron $Q'$, which prevents the material from falling out prematurely, and upon the vacant links cutters or plows m m, preferably of double mold-board form, mounted on suitable supports m', are provided and project to a suitable distance beyond the outer edge of the buckets to further loosen and tear up the soil and spoil.

The carrier is made transversely movable or adjustable for the purpose of cutting any width of ditch desired. In devices of this sort used for ditch-cutting objection is often raised to the inability to cut different widths of ditch with the same appliances. In my device I preferably employ but one carrier-belt, though more can be used, if desired, and the carrying-pulleys and frame therefor are made laterally movable, so that the plows and scoops cut and gather the material from all points within the limits of the lateral swing. To accomplish this a traveling head n is connected to the carrier-frame and bears rollers n', which work against a way N on the frame of the machine. The head n is connected by a pitman o to a crank-wheel o', operated by suitable mechanism from the engine-shaft. The crank $o^2$ is radially adjustable in the wheel. Both the upper and lower drums of the carrier may be adjusted, or only the lower one, if preferred.

To make the carrier dig deeper or shallower beneath the machine-frame, I provide an adjusting screw or screws P' in the upright framing of the machine, by the adjustment of which the desired effects of deep or shallow cutting may be secured.

The vacant links between the buckets, as well as the links on which the buckets are placed, are provided with bottoms q, as seen in Fig. 4, to prevent the dirt from falling through.

Having thus described my invention, what I claim, and desire to secure by Letters Patent, is—

1. The combination, with the carrier, of a series of transverse cutting-knives located in front of the carrier and a series of longitudinal disk cutters arranged in front of and matching the interstices between the transverse knives, as set forth.

2. The combination, with the carrier and truck on which it is mounted, of the transverse cutting-knives mounted in front of the carrier, a transverse shaft mounted in front of the transverse knives, and longitudinal cutting-disks mounted on said shaft, a longitudinal shaft engaging said transverse shaft and also engaging an axle of the truck, and the engine-shaft geared to the longitudinal shaft and provided with a clutch for throwing the latter into and out of gear, as set forth.

3. In a machine of the kind described, the combination, with a laterally-movable carrier, of a series of transverse cutting-knives located in front thereof, and a series of disk cutters arranged in front of and matching the interstices between the transverse knives, both of said series of knives and cutters cutting a wider channel than the carrier, as set forth.

In testimony whereof I affix my signature in presence of two witnesses.

JOSIAH H. L. TUCK.

Witnesses:
LEWIS B. HARRIS,
J. L. RADOVICH.